(12) United States Patent
Perumal et al.

(10) Patent No.: US 10,514,991 B2
(45) Date of Patent: Dec. 24, 2019

(54) FAILOVER DEVICE PORTS

(71) Applicant: HEWLETT PACKARD ENTERPRISE DEVELOPMENT LP, Houston, TX (US)

(72) Inventors: Ayyanar Perumal, Bangalore (IN); Radhakrishnan Velchamy, Bangalore (IN); Rupin T. Mohan, Andover, MA (US); Krishna Puttagunta, Roseville, CA (US); Vivek Agarwal, Andover, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 151 days.

(21) Appl. No.: 15/882,057

(22) Filed: Jan. 29, 2018

(65) Prior Publication Data
US 2019/0034305 A1 Jan. 31, 2019

(30) Foreign Application Priority Data
Jul. 31, 2017 (IN) .............................. 201741027166

(51) Int. Cl.
| | |
|---|---|
| G06F 11/20 | (2006.01) |
| H04L 29/08 | (2006.01) |
| H04L 12/931 | (2013.01) |
| H04L 29/14 | (2006.01) |
| G06F 3/06 | (2006.01) |

(52) U.S. Cl.
CPC ........ *G06F 11/2092* (2013.01); *H04L 49/357* (2013.01); *H04L 67/1097* (2013.01); *H04L 69/40* (2013.01); *G06F 3/067* (2013.01)

(58) Field of Classification Search
CPC ...... G06F 11/2092; H04L 49/30; H04L 49/35; H04L 49/252; H04L 49/55
See application file for complete search history.

(56) References Cited

U.S. PATENT DOCUMENTS

| | | | |
|---|---|---|---|
| 7,319,664 B2 * | 1/2008 | Chen ..................... | H04L 12/437 370/217 |
| 7,966,294 B1 | 6/2011 | Gupta et al. | |
| 9,262,285 B1 | 2/2016 | Wang et al. | |
| 9,350,680 B2 | 5/2016 | Thayalan et al. | |

(Continued)

OTHER PUBLICATIONS

Brocade, "NPIV overview," Brocade Fabric OS Administration Guide, 7.4.1, May 22, 2017, <http://www.brocade.com/content/html/en/administration-guide/fos-741-adminguide/GUID-8340331F-4A3B-446D-B00A-9926B671DC14.html>.

(Continued)

*Primary Examiner* — Nadeem Iqbal
(74) *Attorney, Agent, or Firm* — Hewlett Packard Enterprise Patent Department

(57) ABSTRACT

In some examples, a switch includes a plurality of switch ports, and a processor. The processor is to send, through selected switch ports of the plurality of switch ports, respective requests for port information of device ports of a device connected to the selected switch ports, and receive, from the device responsive to the requests, the port information of the device ports. The processor is to identify, from the device ports of the device in response to the received port information, a failover device port for a first device port of the device, and send, to the device, information of the failover device port for the first device port at the device.

20 Claims, 6 Drawing Sheets

(56) References Cited

U.S. PATENT DOCUMENTS

| | | | |
|---|---|---|---|
| 9,565,113 B2 | 2/2017 | Venkatesh et al. | |
| 9,830,239 B2* | 11/2017 | Nazari | H04L 41/0668 |
| 2010/0145647 A1* | 6/2010 | Bouchard | G06F 11/0733 |
| | | | 702/85 |
| 2015/0370668 A1* | 12/2015 | Nazari | H04L 41/0668 |
| | | | 714/6.3 |
| 2016/0087808 A1* | 3/2016 | Schmidt | H04L 12/1863 |
| | | | 370/390 |

OTHER PUBLICATIONS

CISCO, "iSCSI Storage Networks on Cisco Nexus Switches," (Web Page), Mar. 5, 2015, 7 pages, http://www.cisco.com/c/en/us/products/collateral/storage-networking/mds-9700-series-multilayer-directors/white-paper-c11-734014.html.

Hewlett Packard Enterprise Development LP, "HPE Virtual Connect," May 22, 2017, <https://www.hpe.com/us/en/integrated-systems/virtual-connect.html>.

Hogan, C., "NPIV: N-Port ID Virtualization," Nov. 15, 2011, <https://blogs.vmware.com/vsphere/2011/11/npiv-n-port-id-virtualization.html>.

Shanks, E., "HP Virtual Connect Basics," Aug. 9, 2012, <http://theithollow.com/2012/08/09/hp-virtual-connect-basics/>.

Tseng et al., "Internet Storage Name Service (iSNS)," Sep. 2005, Network Working Group, RFC 4171, <https://tools.ietf.org/pdf/rfc4171.pdf>.

VMWARE, "Configure Fibre Channel NPIV Settings," May 22, 2017, <https://pubs.vmware.com/vsphere-4-esx-vcenter/index.jsp?topic=/com.vmware.vsphere.vmadmin.doc_41/vsp_vm_guide/configuring_virtual_machines/t_configure_fibre_channel_npiv_settings.html>.

Wikipedia, "HP Virtual Connect," Nov. 14, 2016, <https://en.wikipedia.org/w/index.php?title=HP_Virtual_Connect&oldid=749527900>.

Wikipedia, "NPIV," Dec. 13, 2016, <https://en.wikipedia.org/w/index.php?title=NPIV&oldid=754571989>.

* cited by examiner

FAILOVER DEVICE PORTS

BACKGROUND

A storage network can include initiator devices and target devices. A target device can be associated with a storage subsystem, such as a storage array including an array of storage devices. The target device is able to access data of the storage subsystem in response to a request from an initiator device.

BRIEF DESCRIPTION OF THE DRAWINGS

Some implementations of the present disclosure are described with respect to the following figures.

Figure 1:
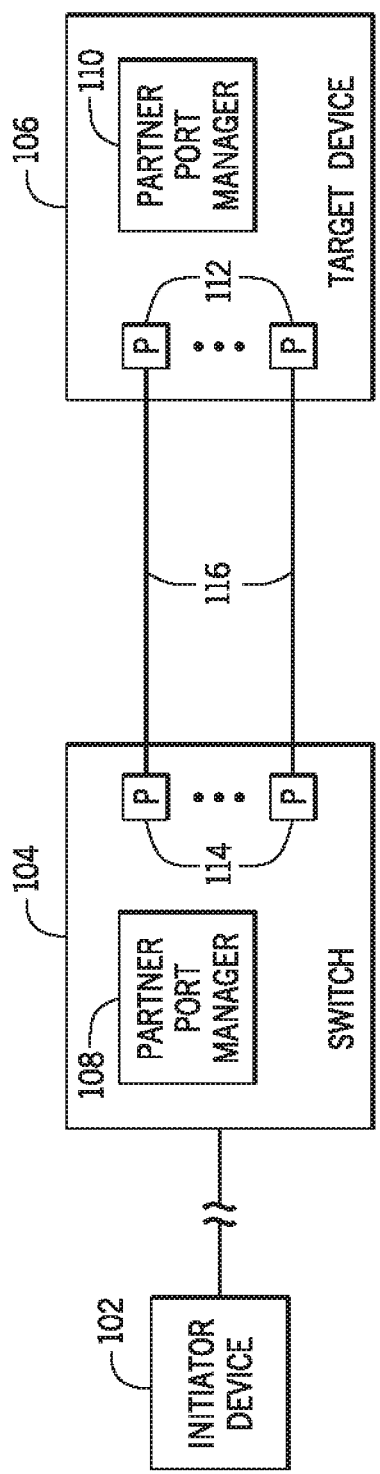
FIG. 1 is a block diagram of an arrangement including an initiator device, a switch, and a target device, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In a storage network, various devices can include ports that can be used to communicate requests and data. The devices include initiator devices, switches, and target devices. An initiator device is able to generate a request to access data. A switch is able to route requests and data between an initiator device and a target device.

A target device can process requests to access data of a storage subsystem. A storage subsystem can refer to a storage device or an arrangement of storage devices (e.g., an array of storage devices) to store data. Multiple target devices can be associated with respective storage subsystems. A storage subsystem can be part of a target device, or can be separate from the target device but is accessible by the target device over a communication link.

A port can refer generally to a communication interface of a device that is able to support communications according to a specified protocol. In some examples of the present disclosure, a port can refer to a storage port that supports a storage-related protocol, such as an Internet Computer System Interface (iSCSI) protocol, a Fibre Channel protocol, and so forth.

If the port is a physical port, then the communication interface includes hardware circuitry (e.g., a transceiver) and possibly machine-readable instructions (e.g., software or firmware) to handle data communication through the physical port. If the port is a virtual port, then the communication interface is a logical communication interface defined by machine-readable instructions to handle data communication through the virtual port.

In the ensuing discussion, a "port" can refer to a physical port or a virtual port.

A target device can include device ports, an initiator device can include device ports, and a switch can include switch ports. The switch ports can be connected over respective communication links to device ports of initiator devices and target devices.

Communications between a switch and an initiator device or a target device can experience a link down condition. In a link down condition, communication over a respective communication link between a device port (of an initiator device or a target device) and a switch port (of a switch) cannot be performed. The link down condition can be caused by a hardware fault (error or failure of a hardware component in a device or a switch, or error or failure of the communication link). Alternatively, a link down condition can be caused by a fault of machine-readable instructions (e.g., a crash or other error of the machine-readable instructions).

To recover from a link down condition of a primary port, a failover port can be used to take over communications for the primary port. A primary port is the port that is designated to perform communications of a device under normal circumstances, absent a failure or fault that would prevent communications through the primary port. The failover port is a backup or standby port that can be activated for use in response to a link down condition of the primary port. In some examples, the configuration of a failover port can be performed manually, such as by an administrator of a storage network or other user. Manual configuration of failover ports is labor intensive. Moreover, a manually selected failover port is statically associated with the primary port (in other words, once a failover port is manually selected, a storage network has to use that selected failover port in case of a link down condition of the respective primary port).

In other examples, configuration of failover device ports can be performed by a system, but such configuration of failover device ports still results in a static association between failover ports and corresponding primary ports. A static association refers to an association that remains fixed once configured, and may not change with changing circumstances.

In accordance with some implementations of the present disclosure, a switch in a storage network is able to dynamically and automatically identify failover device ports at devices, including target devices and/or initiator devices. The switch does not configure dedicated failover device ports on devices as device ports to use in case of a link down condition involving primary device ports, which would result in static association between primary device ports and failover device ports. Instead, the switch is able to request and receive port information of device ports available at a device. In response to the received port information, the switch is able to dynamically identify failover device ports, and send information of the identified failover device ports to the device. A dynamic identification of failover device ports is one where the VFFs created and selected for use can change as circumstances change, such as due to new links coming up, existing links going down, and so forth. Also, identification of failover device ports can be dynamic in the sense that failover device ports selected for use in response to link down conditions can change depending on resource usage or other factors.

FIG. 1 is a block diagram of an example arrangement that includes an initiator device 102, a switch 104, and a target device 106. Although FIG. 1 shows an arrangement in which there is just one initiator device 102, one switch 104, and one target device 106, it is noted in further examples, there can be multiple initiator devices, and/or multiple switches, and/ or multiple target devices.

The switch 104 includes a partner port manager 108, and the target device 106 includes a partner port manager 110. As used here, the term "manager" can refer to a hardware processing circuit, such as any or some combination of the following: a microprocessor, a core of a multi-core microprocessor, a microcontroller, a programmable gate array, a programmable integrated circuit device, or any other type of hardware processing circuit. In other examples, a "manager" can refer to a combination of a hardware processing circuit and machine-readable instructions (e.g., software or firmware) executable on the hardware processing circuit.

The partner port managers 108 and 110 in the switch 104 and the target device 106, respectively, are able to cooperate to dynamically establish failover device ports for respective device ports 112 of the target device. In some examples, the partner port managers 108 and 110 can support N+1 redundancy. In the context of FIG. 1, N+1 redundancy can refer to a redundancy arrangement in which each respective device port 112 has at least one backup device port that can be used in case the respective device port 112 experiences a link down condition. More generally, each respective device port 112 of the target device 106 can fail over to one failover device port or to multiple failover device ports.

As further shown in FIG. 1, the switch 104 has multiple switch ports 114. Each switch port 114 is connected over a communication link 116 to a corresponding device port 112. Although not shown in FIG. 1, switch ports 114 can also be connected over respective communication links to device ports of the initiator device 102.

In some examples, the ports of the initiator device 102, the switch 104, and the target device 106 can communicate according to the iSCSI protocol. In an iSCSI system, the initiator device 102 is referred to as an iSCSI initiator device, the switch 104 is referred to as an iSCSI switch, and the target device 106 is referred to as an iSCSI target device. In other examples, the ports of the initiator device 102, the switch 104, and the target device 106 can communicate according to another storage protocol, such as a Fibre Channel protocol, or a different protocol.

Although reference is made to identifying failover device ports for device ports 112 of the target device 106, it is noted that techniques or mechanisms according to some implementations can also be applied to identify failover device ports for device ports of the initiator device 102. In such examples, the initiator device 102 can also include a partner port manager to cooperate with the partner port manager 108 to dynamically establish failover device ports for device ports of the initiator device 102.

Figure 2:
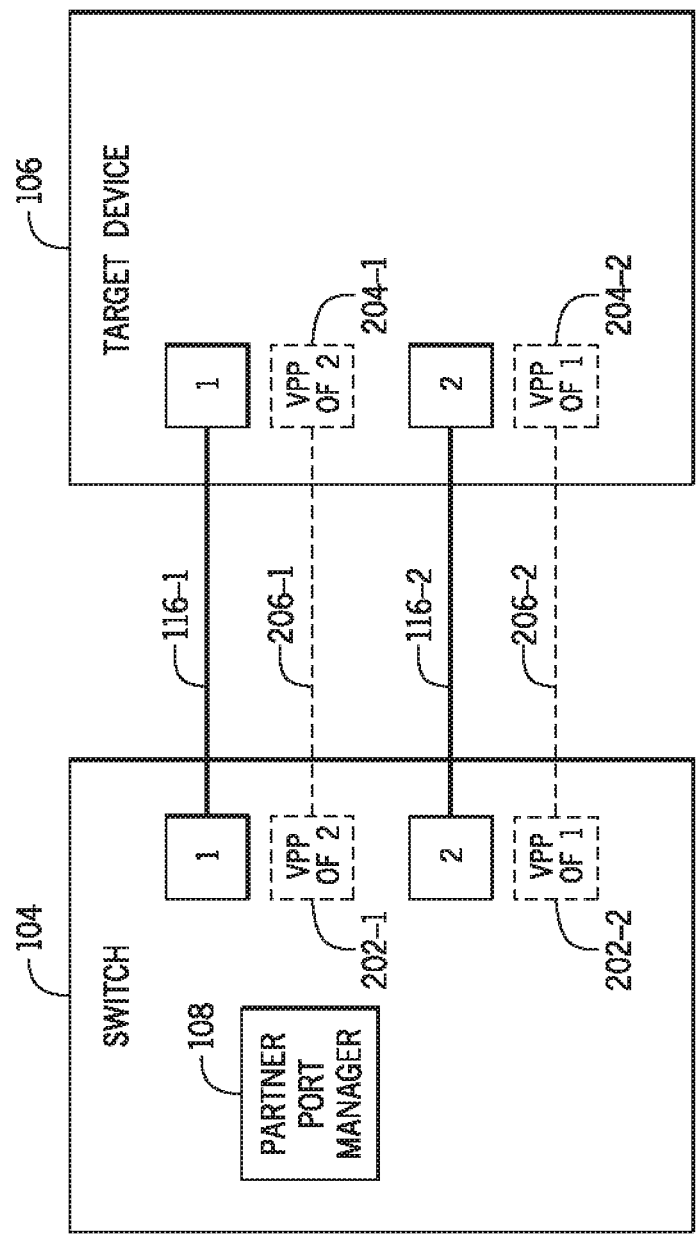
FIG. 2 is a block diagram of an arrangement including a switch, a target device, and ports of the switch and target device, according to further examples.

A failover device port can also be referred to as a virtual partner port In FIG. 2, the switch 104 has switch ports 1 and 2. Switch port 1 is also a virtual partner port (VPP) 202-1 of switch port 2, and switch port 2 is also a VPP 202-2 of switch port 1. The target device 106 has device ports 1 and 2. Device port 1 is also a VPP 204-1 of switch port 2, and device port 2 is also a VPP 202-2 of device port 1.

Switch port 1 is connected to device port 1 by a communication link 116-1. VPP 202-1 and VPP 204-1 are connected by a virtual communication link 206-1; Switch port 2 is connected to device port 2 by a communication link 116-2. VPP 202-2 and VPP 204-2 are connected by a virtual communication link 206-2.

A virtual communication link refers to a logical link that is established over a physical link; The virtual communication link does not have a physical manifestation, but rather is a construct defined by machine-readable instructions. In the example of FIG. 2, the virtual communication link 206-1 is established over the (physical) communication link 116-1. Similarly, the virtual communication link 206-2 is established over the (physical) communication link 116-2.

In an example, if the VPP 202-1 and VPP 204-1 are activated, such as due to a link down condition of the communication link 116-2, then communications between the VPP 202-1 and VPP 204-1 can be performed over the virtual communication link 206-1. Note that data of switch port 1 and device port 1 can also occur over the communication link 116-1 concurrently with the communications over the virtual communication link 206-1.

Figure 3:
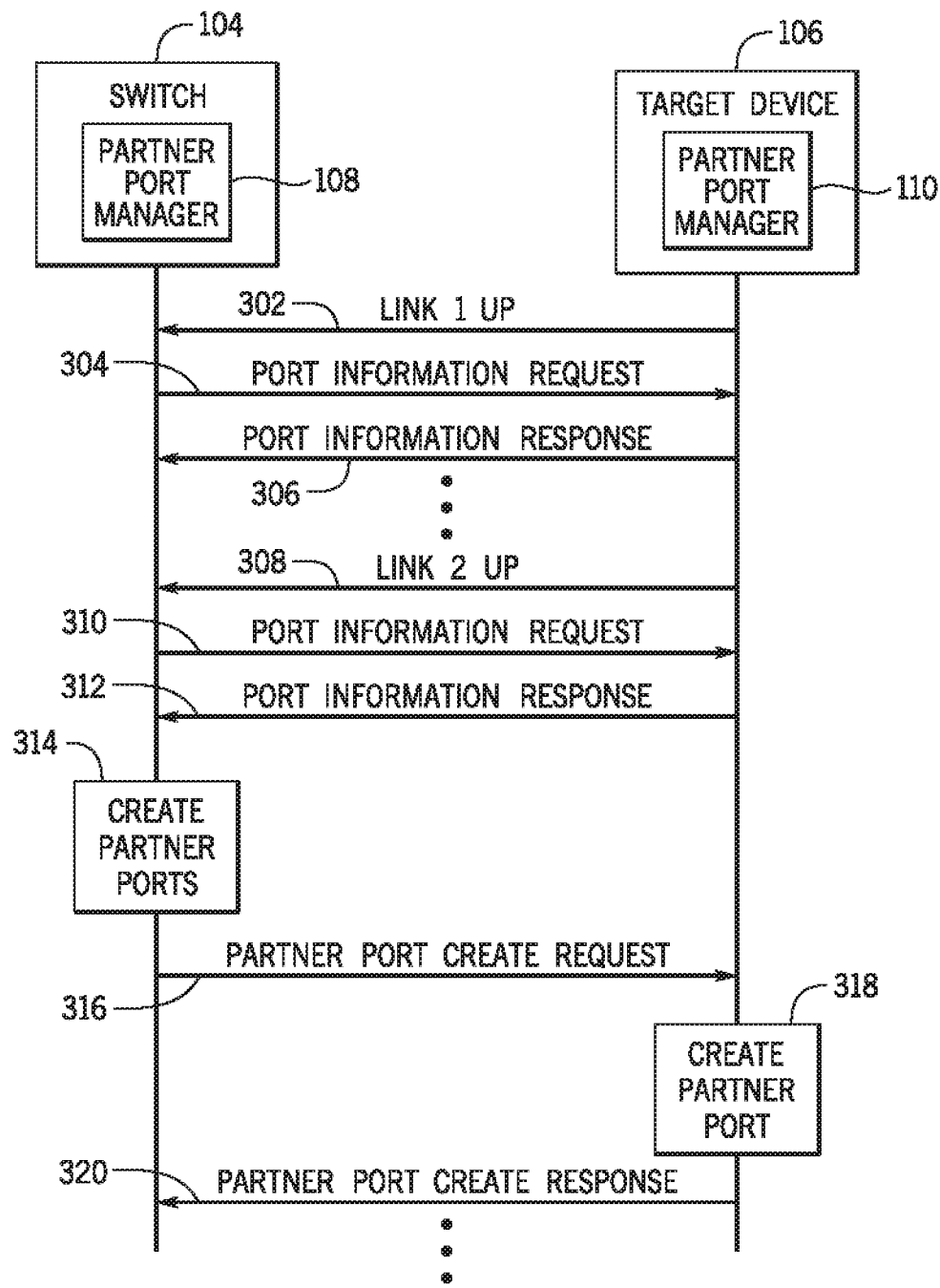
FIG. 3 is a message flow diagram of an initiation process between a switch and a target device, according to some examples.

FIG. 3 is a message flow diagram of an initiation phase that involves exchanges of messages between the switch 104 and the target device 106. Note that although FIG. 3 and the other figures show just one switch 104, techniques or mechanisms according to some implementations of the present disclosure can be applied to a switch fabric with multiple switches, where each switch has switch ports and VPPs. The operations and exchanges of information depicted in FIG. 3 can be performed by the partner port manager 108 in the switch 104 (referred to as the "switch partner port manager 108") and the partner port manager 110 in the target device 106 (referred to as the "device partner port manager 110").

The switch partner port manager 108 detects (at 302) a link 1 up condition, which corresponds to a condition of a first communication link 116 between a first switch port 114 and a first device port 112 becoming active. To detect a link up condition, the switch partner port manager 108 listens to the switch ports 114 of the switch 104. During initialization, a switch port 114 and a respective device port 112 can exchange information as part of a handshake. A successful handshake, as detected by the switch partner port manager 108, based on such exchange of information provides an indication that the communication link between the switch port and the device port is active. The switch partner port manager 108 "listening" to the switch ports 114 can refer to the switch partner port manager 108 monitoring information transmitted and/or received by each switch port 114.

A communication link becoming active can refer to components of the switch 104 and/or the target device 106 and/or the communication link 116 transitioning to a state that supports active communication over the communication link 116. In contrast to a link up condition, a link down condition of a communication link 116 can refer to a condition where a component in the switch 104 and/or a component in the target device 106 and/or the link 116 itself is (are) in a state where communication over the communication link 116 is not possible. For example, the link down condition can be caused by a fault of a switch port 114, a fault of a device port 112, or a fault of the link 116.

In response to detecting the link 1 up condition, the switch partner port manager 108 sends (at 304) a port information request to the target device 106. The port information request is a request for information of a first device port 112 that corresponds to the first communication link.

In response to the port information request, the device partner port manager 110 sends (at 306) a port information response to the switch 104. The port information response includes information that identifies the first device port 116 of the target device 106. The port identification information can include an identifier, in the form of a number, a character string, and so forth, that can be used to uniquely distinguish the first device port 112 from other device ports 112.

At a later time, the switch partner port manager 108 also detects (at 308) a link 2 up condition, which corresponds to a second communication link 116 between a second switch port 114 and a second device port 112 becoming active.

In response to detecting the link 2 up condition, the switch partner port manager 108 sends (at 310) a port information request to the target device 106, to seek port information of the second device port 112. In response to the port information request (310), the device partner port manager 110 sends (at 312) a port information response to the switch 104. The port information response (312) includes port identification information of the second device port 112.

Based on the port information received from the target device 106 in the port information responses (306, 312), the switch partner port manager 108 creates (at 314) VPPs. The created VPPs include VPPs for the device ports of the target device 106—such VPPs are also referred to as failover device ports. The created VPPs also include VPPs for the switch ports of the switch 104. In some examples, the switch partner port manager 108 can create a specified number (one or greater than one) of VPPs for each device port of the target device 106, and correspondingly, for each switch port of the switch 104.

For each VPP created by the switch 104, the switch partner port manager 108 sends (at 316) a partner port create request to the target device 106. The partner port create request (316) identifies the respective VPP that is to be created, along with the device port associated with the VPP that is to be created. In response to the partner port create request, the device partner port manager 110 creates (at 318) the identified VPP.

Creating a VPP refers to configuring a port of the switch 104 or the target device 106 to act as a standby port for another switch port or device port.

Once the VPP has been successfully created at the target device 106, the device partner port manager 110 sends (at 320) a partner port create response to the switch 104. The partner port create response can include an indication of successful creation of the VPP at the target device 106. Alternatively, if the creation of the VPP failed at the target device 106, the partner port create response can indicate this failure.

The switch partner port manager 108 can send multiple partner port create requests to the target device 106 to cause creation of respective VPPs at the target device 106. Alternatively, the switch partner port manager 108 can send one partner port create request to the target device 106 to cause creation of multiple VPPs at the target device 106.

The creation of VPPs is dynamic in that the VPPs that are created are based on port information received by the switch partner port manager 108. Moreover, as discussed further below, where multiple VPPs are available for a given device port, the selection of a VPP in case of a link down condition associated with the given device port can be based on resource usage or other factors, which allows VPP selection to be dynamic.

Figure 4:
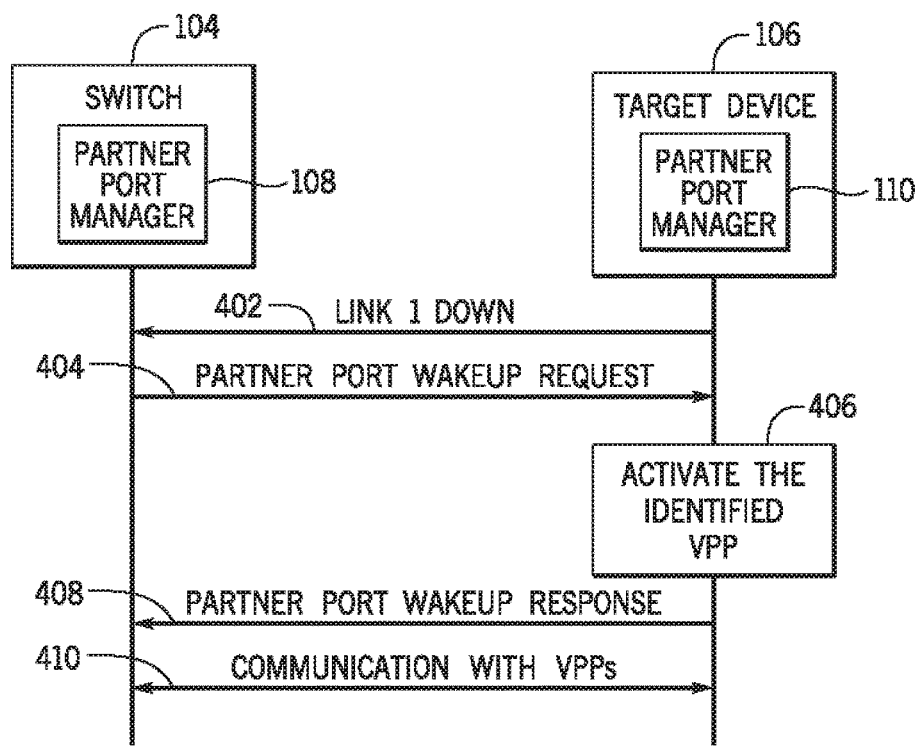
FIG. 4 is a message flow diagram of a failover process between a switch and a target device, according to some examples.

FIG. 4 depicts a message flow diagram of a failover process in response to a link down condition. Reference is also made to FIG. 2 in the following discussion. As shown in FIG. 4, the switch partner port manager 108 detects (at 402) a link 1 down condition, which corresponds to a first communication link (such as communication link 116-1 in FIG. 2) between switch port 1 and device port 1 being down.

In response detecting the link 1 down condition, the switch partner port manager 108 sends (at 404) a partner port wakeup request to the target device 106. The partner port wakeup request can identify the specific VPP that is to be awakened, i.e., activated. For example, in FIG. 2, the VPP at the target device 106 to be awakened would be VPP 204-2, so that communication can occur over the virtual communication link 206-2 with the VPP 202-2 in the switch 104 as failover for the link 1 down condition. Prior to being awakened, a VPP can be in a dormant state—i.e., the VPP does not perform communications. The sending of the partner port wakeup request to the target device 106 is to cause recovery from the link 1 down condition. The partner port wakeup request is an example of a failover indication that can be sent by the switch 104 to cause failover from a device port to a VPP.

Each VPP can be identified by a respective identifier, for example. The partner port wakeup request can include an identifier of a VPP to be awakened Alternatively, the partner port wakeup request can identify the device port associated with link 1 that is down. In this alternative example, the target device 106 is able to determine the VPP corresponding to the device port associated with link 1 that is down, such as by accessing a data structure (e.g., a map) that maps each device port to a corresponding VPP (or VPPs).

In the example relating to FIG. 2 noted above, to recover from the link 1 down condition, the switch partner port manager 108 can activate VPP 202-2 (which is the VPP for switch port 1) and can send a partner port wakeup request to the target device 106 that identifies VPP 204-2 (VPP for device port 1) for wakeup.

In some examples, the switch partner port manager 108 can pre-select a VPP (from among the VPPs created according to the FIG. 3 process) for each device port 112 of the target device 106 prior to detection of any link down condition. In such examples, since the VPPs have already been selected, no VPP initialization process has to be performed due to a link down condition, which allows a failover to occur more quickly.

In alternative examples, the switch partner port manager 108 can select a VPP (from among the VPPs created according to the FIG. 3 process) for each device port 112 of the target device 106 after detection of a link down condition. In such alternative examples, the VPP selected is from among the available VPPs at the time of the link down condition. This can provide for enhanced flexibility since the switch partner port manager 108 can select from among any of available VPPs at the time of a link down condition.

In response to the partner port wakeup request, the device partner port manager 110 activates (at 406) the identified VPP (as identified by the partner port wakeup request). The device partner port manager 110 further sends (at 408) a partner port wakeup response to the switch 104. The partner port wakeup response indicates whether or not the VPP identified in the partner port wakeup request was successfully activated. The partner port wakeup response may also include an identifier of a VPP that was activated.

Assuming that the identified VPP in the target device 106 has been activated, that means that in the example of FIG. 2, the VPP 202-2 and the VPP 204-2 can communicate (at 410) with each other over the virtual communication link 206-2. The data communication over the virtual communication link 206-2 can occur concurrently with data communication over the physical link 206-2 between switch port 2 and device port 2.

In further examples, multiple VPPs at the target device 106 may have been created for device port 1. In such examples, the partner port wakeup request (404) can identify multiple VPPs corresponding to device port 1. Alternatively, the partner port wakeup request (404) can identify the device port associated with the link 1 down condition; based on the identified device port, the target device 106 is able to determine the VPPs associated with the identified device port. The device partner port manager 110 can select from among the multiple VPPs, based on a specified selection criterion. For example, the selection criterion can be a round robin criterion that selects the next VPP after the VPP that was last selected. Alternatively, the selection criterion can be a random criterion that selects from among the multiple VPPs in a random manner.

As a further example, the selection criterion can be based on resource usage, where the device partner port manager 110 can select one of the VPPs based on usage of resources of the respective VPPs. Resource usage can refer to usage of a processing resource, a storage resource, and/or a communication resource. As noted above, a VPP is a device port that is designated as a standby port for another device port. Thus, resource usage of a VPP refers to usage of resources of the device port implementing the VPP. The device partner port manager 110 can select the VPP with a lower resource usage.

The device partner port manager 110 can send, in the partner port wakeup response (408), port information (e.g., an identifier) of the selected VPP. In response to the received port information, the switch 104 can communicate data that is targeted to the first device port to the identified VPP.

In additional examples, the switch 104 can send, to the initiator device 102, information relating to the link down condition. This can allow the initiator device 102 to take action with respect to the link down condition, such as to perform diagnostics of links that have gone down.

After link 1 has gone down, at some point, link 1 can come back up again, such as due to the faulty condition resolving itself or due to corrective action having been taken to address the link 1 down condition.

Figure 5:
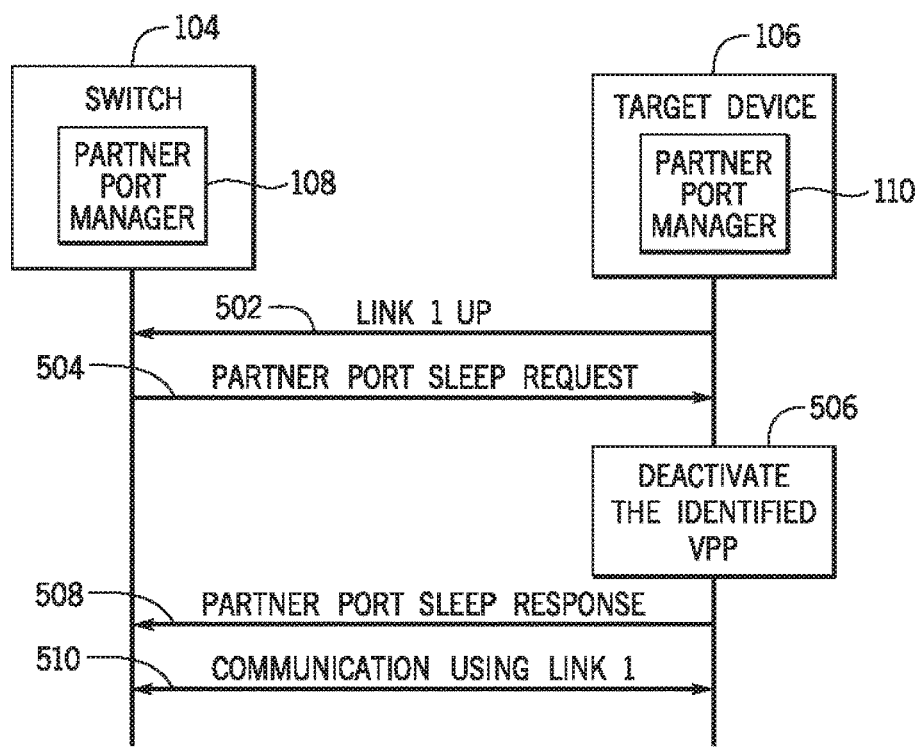
FIG. 5 is a message flow diagram of a failback process between a switch and a target device, according to some examples.

FIG. 5 is a message flow diagram of a process of performing fallback in response to link 1 being up. The failback causes communication to be provided over link 1 again between switch port 1 and device port 1 (FIG. 2), instead of over the virtual communication link 206-2 between VPPs 202-2 and 204-2.

As shown in FIG. 5, the switch partner port manager 108 detects (at 502) a link 1 up condition. In response to detecting the link 1 up condition, the switch partner port manager 108 sends (at 504) a partner port sleep request to the target device 106, where the partner port sleep request identifies the VPP (e.g., the VPP 204-2) at the target device 106 that is to be deactivated. The partner port sleep request is an example of a fallback indication that is used to cause fallback from the VPP to the original device port, in response to the link 1 up condition.

In response to the partner port sleep request, the device partner port manager 110 deactivates the VPP identified in the partner port sleep request. In addition, the device partner port manager 110 activates device port 1 (FIG. 2), so that communication can again proceed over the communication link 116-1.

The device partner port manager 110 sends (at 508) a partner port sleep response back to the switch 104, to inform the switch partner port manager 108 that the VPP identified in the partner port sleep request has been deactivated. At this point, the switch partner port manager 108 can deactivate the corresponding VPP (e.g., the VPP 202-2) at the switch 104. In some examples, the partner port sleep response (508) can include an idle primitive to indicate that the VPP that is deactivated is in the dormant state (i.e., the VPP is currently not in use but available for use later).

Once the VPP 202-2 and 204-2 are deactivated, the switch 104 and the target device 106 can again perform (at 510) communications over link 1 (the communication link 116-1) using between switch port 1 and device port 1.

Figure 6:
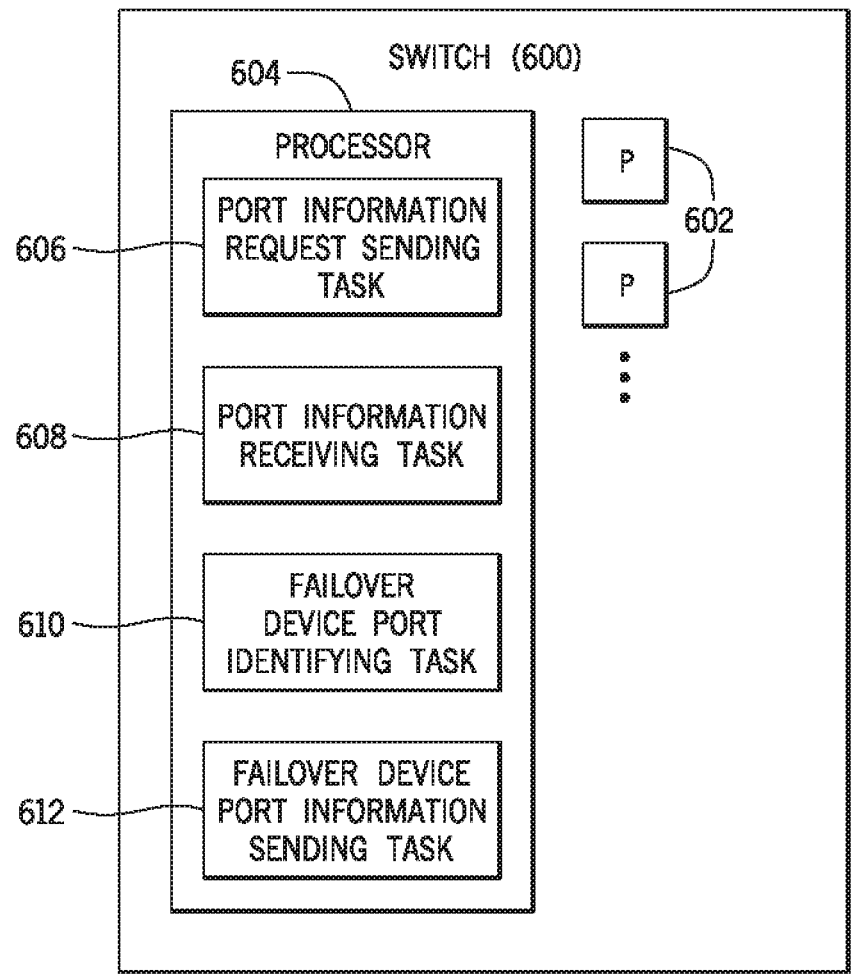
FIG. 6 is a block diagram of a switch according to some examples.

FIG. 6 is a block diagram of a switch 600 according to some examples. The switch 600 can be an example of the switch 104 depicted in FIGS. 1-5. The switch 600 includes a plurality of switch ports 602, and a processor 604 to perform various tasks. A processor performing a task can refer to one processor performing the task, or multiple processors performing the task. A processor can include a microprocessor, a core of a multi-core microprocessor, a microcontroller, a programmable integrated circuit, a programmable gate array, or another hardware processing circuit.

The tasks performed by the processor 604 include a port information request sending task 606 to send, through selected switch ports of the plurality of switch ports 602, respective requests for port information of device ports of a device (e.g., the target device 106 or the initiator device 102) connected to the selected switch ports. The tasks further include a port information receiving task 608 to receive, from the device responsive to the requests, the port information of the device ports. The tasks further include a failover device port identifying task 610 to identify, from the device ports of the device in response to the received port information, a failover device port for a first device port of the device. The tasks further include a failover device port information sending task 612 to send, to the device, information of the failover device port for the first device port at the device.

In some examples, the processor 604 is able to identify, from the device ports of the device in response to the received port information, a further failover device port for the first device port of the device. The processor 604 sends, to the device, information of the further failover device port for the first device port at the device.

Figure 7:
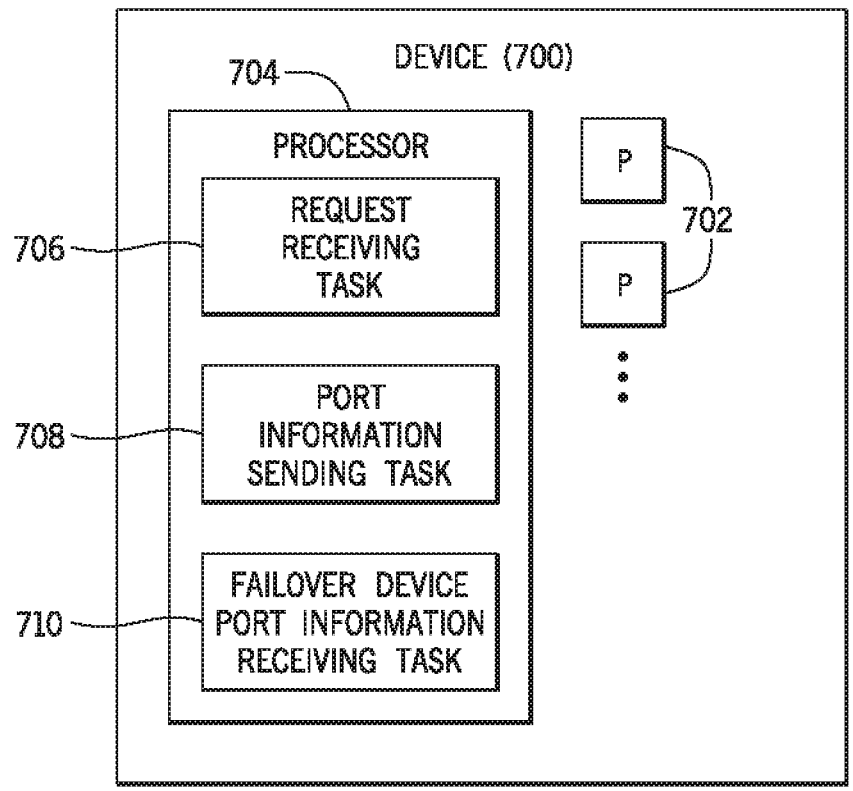
FIG. 7 is a block diagram of a device according to further examples.

FIG. 7 is a block diagram of a device 700, such as the target device 106 or the initiator device 102. The device 700 includes a plurality of device ports 702, and a processor 704 to perform various tasks. The tasks include a request receiving task 706 to receive, from switch ports of a switch, respective requests for port information of the plurality of device ports. The tasks further include a port information sending task 708 to, in response to the requests, send, to the switch, the port information of the plurality of device ports 702. The tasks further include a failover device port information receiving task 710 to receive, from the switch, information of a failover device port for a first device port of the plurality of device ports at the device, the failover device port for the first device identified by the switch based on the sent port information.

Figure 8:
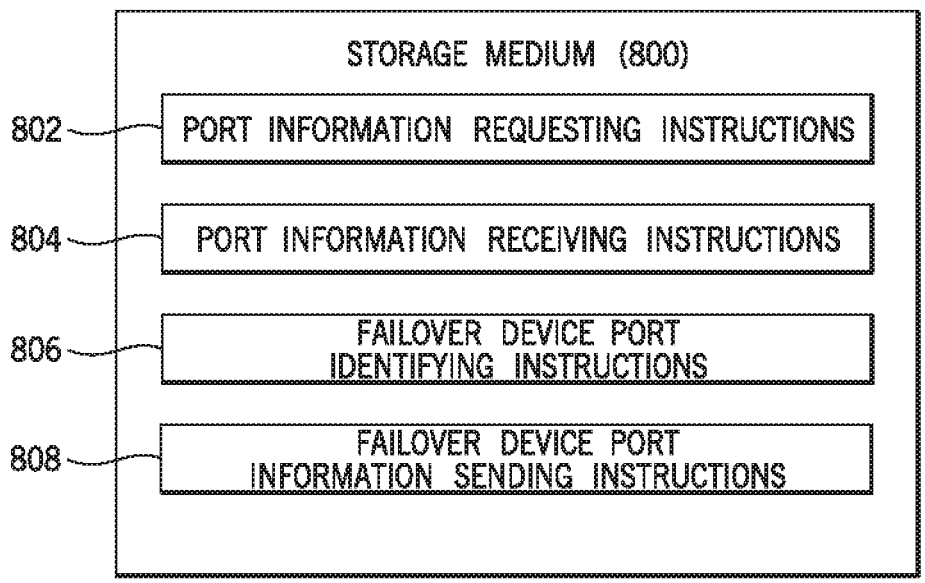
FIG. 8 is a block diagram of a storage medium storing machine-readable instructions according to additional examples.

FIG. 8 is a block diagram of a non-transitory machine-readable or computer-readable storage medium 800 storing machine-readable instructions that upon execution cause a switch to perform various tasks. The machine-readable instructions include port information requesting instructions 802 to send, through selected switch ports of a plurality of switch ports at the switch, respective requests for port information of device ports of a device connected to the selected switch ports. The machine-readable instructions further include port information receiving instructions 804 to receive, from the device responsive to the requests, the port information of the device ports.

The machine-readable instructions further include failover device port identifying instructions 806 to identify, from the device ports of the device in response to the received port information, failover device ports for the device ports of the device. The machine-readable instructions further include failover device port information sending instructions 808 to send, to the device, information of the failover device ports for the device port at the device.

The storage medium 800 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that he appended claims cover such modifications and variations.

We claim:

1. A switch comprising:
a plurality of switch ports; and
a processor to:
send, through selected switch ports of the plurality of switch ports, respective requests for port information of device ports of a device connected to the selected switch ports;
receive, from the device responsive to the requests, the port information of the device ports;
identify, from the device ports of the device in response to the received port information, a failover device port for a first device port of the device; and
send, to the device, information of the failover device port for the first device port at the device.

2. The switch of claim 1, wherein the device comprises a target device to manage access of a storage subsystem, or an initiator device to request access of a storage subsystem through the switch.

3. The switch of claim 1, wherein responsive to a link down condition associated with the first device port at the device, the failover device port is useable as a virtual partner port for the first device port.

4. The switch of claim 3, wherein the identifying of the failover device port is performed prior to the link down condition, or in response to the link down condition.

5. The switch of claim 1, wherein the processor is to further:
listen on the plurality of switch ports to detect a link up condition between the first device port of the device and a first switch port of the switch,
wherein sending a first request of the requests is responsive to detecting the link up condition between the first device port of the device and the first switch port of the switch.

6. The switch of claim 1, wherein the processor is to further:
identify, from the device ports of the device in response to the received port information, a further failover device port for the first device port of the device; and
send, to the device, information of the further failover device port for the first device port at the device.

7. The switch of claim 1, wherein the processor is to further:
detect a link down condition between a first switch port of the switch and the first device port of the device; and
in response to detecting the link down condition, send a request to the device to cause recovery from the link down condition.

8. The switch of claim 7, wherein the processor is to further:
receive, from the device in response to the request to cause recovery from the link down condition, port information of the failover device port selected by the device as a virtual partner port for the first device port of the device; and
responsive to receiving, from the device, the port information of the failover device port, communicate data that is targeted to the first device port to the failover device port.

9. The switch of claim 8, wherein the processor is to further:
after the link down condition has been detected:
detect a link up condition between the first switch port and the first device port; and
in response to detecting the link up condition, send a request to the device to cause deactivation of the failover device port, and communicate data that is targeted to the first device port to the first device port.

10. The switch of claim 7, wherein the device is a target device, and wherein the processor is to further:
send, to an initiator device, information relating to the link down condition.

11. A device comprising:
a plurality of device ports; and
a processor to:
receive, from switch ports of a switch, respective requests for port information of the plurality of device ports;

in response to the requests, send, to the switch, the port information of the plurality of device ports; and receive, from the switch, information of a failover device port for a first device port of the plurality of device ports at the device, the failover device port for the first device port identified by the switch based on the sent port information.

12. The device of claim 11, wherein the processor is to: receive, from the switch, a failover indication that is sent by the switch in response to the switch detecting a link down condition between the first device port and a respective switch port of the switch.

13. The device of claim 12, wherein the processor is to: in response to the failover indication, select the failover device port to use as a virtual partner port for the first device port; and send, to the switch, information of the selected failover device port.

14. The device of claim 13, wherein the processor is to: receive, from the switch, data at the selected failover device port, the data being targeted to the first device port.

15. The device of claim 13, wherein the processor is to: select the failover device port from a plurality of available failover device ports at the device, the plurality of available failover device ports identified by the switch.

16. The device of claim 15, wherein the processor is to: select the failover device port from the plurality of available failover device ports using a selection criterion.

17. The device of claim 16, wherein the selection criterion specifies failover device port selection based on usage of resources associated with the plurality of available failover device ports.

18. The device of claim 12, wherein the processor is to: receive, from the switch, a fallback indication that is sent by the switch in response to the switch detecting a link up condition between the first device port and the respective switch port of the switch; and in response to the fallback indication, place the selected failover device port in an inactive state, and place the first device port in an active state.

19. A non-transitory machine-readable storage medium storing instructions that upon execution cause a switch to:

send, through selected switch ports of a plurality of switch ports at the switch, respective requests for port information of device ports of a device connected to the selected switch ports;

receive, from the device responsive to the requests, the port information of the device ports;

identify, from the device ports of the device in response to the received port information, failover device ports for the device ports of the device; and send, to the device, information of the failover device ports for the device port at the device.

20. The non-transitory machine-readable storage medium of claim 19, wherein the instructions upon execution cause the switch to:

in response to a link down condition between a first device port of the device ports of the device and a respective switch port of the switch, initiate a failover procedure to activate a first failover device port of the failover device ports; and following the link down condition, in response to a link up condition between the first device port and the respective switch port, initiate a failback procedure to deactivate the first failover device port.

* * * * *